United States Patent
Sy

(10) Patent No.: US 8,498,415 B2
(45) Date of Patent: Jul. 30, 2013

(54) METHOD FOR PRESERVING PRIVACY OF A REPUTATION INQUIRY IN A PEER-TO-PEER COMMUNICATION ENVIRONMENT

(76) Inventor: Bon K. Sy, Bayside, NY (US)

( * ) Notice: Subject to any disclaimer, the term of this patent is extended or adjusted under 35 U.S.C. 154(b) by 1136 days.

(21) Appl. No.: 12/324,969

(22) Filed: Nov. 28, 2008

(65) Prior Publication Data

US 2009/0136033 A1 May 28, 2009

Related U.S. Application Data

(60) Provisional application No. 61/004,407, filed on Nov. 27, 2007.

(51) Int. Cl.
*H04K 1/00* (2006.01)
(52) U.S. Cl.
USPC ............................ 380/255; 713/165; 713/167
(58) Field of Classification Search
USPC .................................. 380/255; 713/165, 167
See application file for complete search history.

(56) References Cited

U.S. PATENT DOCUMENTS

| | | | | |
|---|---|---|---|---|
| 7,630,986 | B1* | 12/2009 | Herz et al. ............................ 1/1 |
| 7,849,502 | B1* | 12/2010 | Bloch et al. ....................... 726/11 |
| 2002/0062368 | A1* | 5/2002 | Holtzman et al. ............. 709/224 |
| 2004/0243816 | A1* | 12/2004 | Hacigumus et al. ........... 713/193 |
| 2005/0166046 | A1* | 7/2005 | Bellovin et al. ................ 713/165 |
| 2006/0129811 | A1* | 6/2006 | Fiske ............................. 713/167 |
| 2007/0016528 | A1* | 1/2007 | Verhaegh et al. ............... 705/50 |
| 2007/0086592 | A1* | 4/2007 | Ellison et al. ................. 380/282 |
| 2007/0116283 | A1* | 5/2007 | Tuyls et al. .................... 380/255 |
| 2007/0130351 | A1* | 6/2007 | Alperovitch et al. .......... 709/229 |
| 2007/0294339 | A1* | 12/2007 | Ala-Kleemola et al. ....... 709/203 |
| 2008/0037774 | A1* | 2/2008 | Slavin ............................. 380/30 |
| 2008/0114709 | A1* | 5/2008 | Dixon et al. .................... 706/13 |
| 2009/0089789 | A1* | 4/2009 | Faltings et al. ................ 718/104 |
| 2009/0094041 | A1* | 4/2009 | Buss ................................ 705/1 |

OTHER PUBLICATIONS

Sy, Bon, Peer to Peer Privacy Preserving Reputation Inquiry: An Agent assistant Approach, Jul. 2007.*
Zhang, Yanchao, A Fine-grainted reputation System for Reliable Service Selection in Peer-to Peer networks, Aug. 2007.*
Zhou, Runfang, PowerTrust: A Robust and Scalable Reputation System for Trusted Peer to Peer Computing, Apr. 2007.*
Jung-San Lee and Chin-Chen Chang, Choosing t-out- of-N Secrets by Oblivious Transfer, Information and Security, International Journal, vol. 18, 2006.*

(Continued)

*Primary Examiner* — Ashok Patel
*Assistant Examiner* — Gary Gracia
(74) *Attorney, Agent, or Firm* — Christopher E. Blank, Esq.; Peter J. Mikesell; Hiscock & Barclay, LLP

(57) ABSTRACT

A method for preserving privacy of a reputation inquiry in a peer-to-peer communication environment. The method allows peers using their own personal agents to obtain reputation information of each other through a pair of trustworthy mediator proxies. A mediator proxy is considered trustworthy if even when it is compromised it can guarantee three conditions: (1) the anonymity of the identity of the responders and the target being inquired; (2) the privacy of the content in an inquiry and a response; and (3) the boundary limit of the reputation summary with no possibility of combining the response of multiple inquiries to reverse engineer the reputation rating of an individual responder.

8 Claims, 10 Drawing Sheets

OTHER PUBLICATIONS

Yao, D., Tamassia, R., and Proctor, S. 2007. Private distributed scalar product protocol with application to privacy-preserving computation of trust. In Proceedings of the IFIPTM Joint iTrust and PST Conferences on Privacy, Trust Management and Security (iTRUST'07).*

B. Yu, M.P. Singh; "Towards a Probabilistic Model of Distributed Reputation management," 4th Workshop on Deception, Fraud, and Trust in Agent Societies, Montreal, Canada, 2001; (13 pages).

C. Dellarocas; "Immunizing Online Reputation Reporting Systems Against Unfair Ratings and Discriminatory Behavior," Proc. 2nd ACM Conference on Electronic Commerce, 2000. (8 pages).

R. Sherwood; B. Shattacharjee, A. Srinivasan; , "P5: A protocol for Scalable Anonymous Communication," In Proc. IEEE Symp. Security and Privacy, Oakland, CA, May 2002, (13 pages).

M. Waldman, A.D. Rubin, L.F. Cranor; "Publius: A robust, tamper-evident, censorship-resistant, web publishing system," In Proc. USENIX Security Symp., 2000, (14 pages).

L. Sweeney, "Achieving k-anonymity privacy protection using generalization and suppression." International Journal on Uncertain, Fuzziness, Knowledge-Based System, vol. 10, No. 5, Oct. 2002 (18 pages).

L. Sweeney, "K anonymity: A model for protecting privacy, " International Journal on Uncertain, Fuzziness, Knowledge-Based System, vol. 10, No. 5, Oct. 2002 (14 pages).

S. Goel, M. Robson, M. Polte, Emg. Sirer; "Herbivore: A scalable and efficient protocol for anonymous communications," Dept. Computer Information Science, Cornell University, Ithaca, NY, CIS Techn. Rep. TR2003-1890, Feb. 2003 (17 pages).

* cited by examiner

METHOD FOR PRESERVING PRIVACY OF A REPUTATION INQUIRY IN A PEER-TO-PEER COMMUNICATION ENVIRONMENT

CROSS-REFERENCE TO RELATED APPLICATIONS

This application claims priority to and the benefit of U.S. provisional patent application Ser. No. 61/004,407, filed Nov. 27, 2007, which application is incorporated herein by reference in its entirety.

FIELD OF THE INVENTION

The embodiments of the present invention relate to a method for a reputation inquiry, and more particularly, the embodiments of the present invention relate to a method for preserving privacy of a reputation inquiry in a peer-to-peer communication environment.

BACKGROUND OF THE INVENTION

Reputation systems have been studied across a number of diverse disciplines. For example, the user feedbacks posted after the completion of a transaction in ebay is perhaps one of the most well known reputation systems. Reputation in ebay is simply a function of the cumulative positive and non-positive ratings for a seller or a buyer over the history of being an eBay member. As pointed out elsewhere, one of the most noticeable effects, so called Pollyanna-effect, is the disproportional large number of positive feedbacks and rare negative feedbacks. The Pollyanna-effect is particularly evident on eBay. Public disclosure of rating and rater information is one of the many factors attributing to eBay's Pollyanna-effect. There are also studies on the vulnerability of a reputation system and the risk of misbehavior because of the lack of reputation consequence. For example, Sybil attack is not uncommon in an environment when a participant in the reputation system can easily create multiple identities.

There are many applications to the reputation inquiry just described, e.g., reputation-based network security and reputation-based medical referral. For example, a patient may want to know the reputation of a physician from, for example, other participants in an online blog. The patient could post the reputation inquiry on the online blog and hope that those who have been treated by the physician could offer useful feedbacks on the physician. In a typical online blog, all participants, including the physicians, can see all the postings of each other. Consequently, the alias identity of the patient, the feedback providers, and the reputation feedback are now all exposed to the public and subject to manipulation, e.g., the physician could create an alias identity and enter biased feedback for himself/herself.

One of the challenges when constructing a reputation system is in establishing the system's trustworthiness and managing the risk of undesirable bias introduction. Consider party P1 solicits an opinion about party P2 from parties P3 and P4 (the referees with regard to the inquiry about P2), and party P4 solicits an opinion about party P3 from party P2 (the referees with regard to the inquiry about P3). If these solicitations are held in public, parties P2 and P3 will each know that the other party is being solicited for feedbacks. Consequently, both parties may artificially inflate/deflate their opinion about each other in exchange for a favor/revenge, thus introducing undesirable bias. When this happens, the integrity of the reputation inquiry is compromised and its trustworthiness becomes questionable.

Clearly, the success of a reputation inquiry depends on its ability to guarantee the privacy of each party on expressing its opinion about each other. A commonly encountered strategy is to introduce a mediator proxy (see FIG. 1) to achieve a double-blind process. In doing so, administrative policy is required to verify that the mediator proxy maintains the confidentiality of the information flowing through it. The compliance of the policy, however, may not be enforceable and its success relies on the voluntarily participation of the parties. For example, the eBay feedback system is one such case, which relies on voluntarily participation of the buyers and sellers.

Even if voluntarily participation exists, there can be a privacy leak from the mediator proxy. Note that in a traditional double-blind process, the mediator proxy has the information about the identity of the inquirer (party P1), the identity of the target (party P2), and the identities of the referees (parties P3 and P4). If there is a security breach on the mediator proxy, then the privacy of all parties in the above example is compromised. The mediator proxy could be compromised due to, for example, passive sniffing by the peers on the communication channel between the mediator proxy and the inquirer/referee(s), or a legal or illegal interception of the communication channel by an intruder/authority.

Two main approaches are typically encountered in regard to protecting the identity of participating parties, namely, store-and-forward proxy, and broadcasting. An example of a store-and-forward proxy approach is the Publius system relying on encryption and threshold key distributed to a static, system-wide list of servers to protect identity of a publisher. Broadcasting as discussed elsewhere, on the other hand, protects identity of a responder. Personal privacy protocol ("$P^5$") provides mutual—inquirer and responder—anonymity through transmitting an inquiry and a response to a broadcast group, as opposed to an individual party.

For protecting the privacy of the inquiry content and response, k-anonymity and cryptographic application are two general concepts commonly encountered. The basic idea behind k-anonymity is to introduce poly-instantiation so that an entity value is indistinguishable from (k−1) other objects assuming the same value. Exemplary privacy preserving techniques based on k-anonymity could be found elsewhere. Cryptographic application to privacy preserving has ranged from applying standard encryption techniques and PKI for protecting the "secrets" of the inquiry content and response, to creating a dining cryptographer network, such as Herbivore. A certain trust assumption is made in the cryptographic application to privacy preserving communication, particularly, the trustworthiness of the parties involved in the communication process. The embodiments of the present invention could be considered as one kind of cryptographic application to privacy preserving communication but with a provable privacy assurance similar to that of Herbivore.

The prior art generally fails to provide adequate privacy protection. Reputation inquiry without privacy protection is vulnerable to the Pollyanna effect. The Pollyanna effect, as exemplified in eBay, is a disproportional large number of positive feedbacks and rare negative feedbacks. Public disclosure of the rating and the rater information is one of the many factors attributed to the Pollyanna effect. As such, the "true value" of a reputation rating in such an environment becomes difficult to discern.

The prior art that utilizes the broadcasting approach opens itself to the possibility of establishing direct communication to the inquirer. Broadcasting approach to achieve identity anonymity typically relies on some kind of proxy to broadcast the inquiry to responders. If the responders reply directly to the inquirer, the identity of the responders is exposed, thus entailing a privacy leak. If the responders reply via the proxy, such as a personal privacy protocol $P^5$, the proxy becomes the central point entailing the risk of a privacy leak. It is because the proxy will know the identity and the content of the inquirer, as well as the identity and the response of the responders. Although protocols relying on broadcasting provide some degree of identity anonymity, they are typically not sufficient to prevent a privacy leak. This is particularly so in an environment allowing an inquirer to construct an arbitrary reputation inquiry. For example, an inquirer constructs a query inquiring about one specific individual and targets at one specific responder. In doing so, the privacy of the reputation rating of a responder on the specific individual is no longer protected, even if broadcasting and encryption are employed.

The prior art that utilizes k-anonymity does not even attempt to protect the content of a response. K-anonymity introduces poly-instantiation so that an entity value is indistinguishable from (k−1) other objects assuming the same value, e.g., K entities assuming the same ID number so that the ID number could not be used to reverse-identify an individual entity without ambiguity. K-anonymity only protects the privacy of the inquirer and responders through broadcasting. It does not protect the content confidentiality unless technology, such as cryptography, is applied. While cryptographic application protects the content confidentiality, infrastructure for encryption and decryption key management and distribution is required. Key management and distribution are particularly difficult in a P2P environment because of its dynamic nature where peers could come and go anytime, and do not know each other.

Thus, it is an object of the embodiments of the present invention to provide a method for preserving privacy of a reputation inquiry in a peer-to-peer communication environment, which avoids the disadvantages of the prior art.

Briefly stated, another object of the embodiments of the present invention is to provide a method for preserving privacy of a reputation inquiry in a peer-to-peer communication environment. The method allows peers using their own personal agents to obtain reputation information of each other through a pair of trustworthy mediator proxies. A mediator proxy is considered trustworthy if even when it is compromised it can guarantee three conditions: (1) the anonymity of the identity of the responders and the target being inquired; (2) the privacy of the content in an inquiry and a response; and (3) the boundary limit of the reputation summary with no possibility of combining the response of multiples inquiries to reverse engineer the reputation rating of an individual responder.

SUMMARY OF THE INVENTION

An inquirer (or agent acting on behalf of the inquirer) decides he/she wants to know what a first party (e.g. "P3") thinks about a second party (e.g. "P2"). P3, like all parties in the peer-to-peer environment, has a rating score for P2, but it is only P3's rating score that the inquirer is interested in. An inquiry vector is generated by linearly combining two or more queries. This linear combination masks the question about P2 such that a key (set by the inquirer) is needed to re-combine the two queries. The vector is sent to an inquiry handler who sends it on to P3 and P4 and whoever else is in the system. In this fashion, P3 remains unaware that it is the responder of interest and none of the responders know the identity of the inquirer. In some embodiments, an agent handles the transfer of the vector from the inquirer to the inquiry handler. Every party in the peer-to-peer environment who receives the vector raises each of the elements in the vector by a power equal to their rating scores for that element. Thus, P3 is not aware that it is the opinion about P2 that is specifically being targeted. Each individual party sends a response to a response handler who summarizes the responses and then relays the reply back to the inquirer (or an agent). The response handler may add random noise to the summary response. The response handler was told, by the inquiry handler, where to send the response.

Once the inquirer receives the summary report, the key is used to re-combine the (now raised by some power) queries. Those queries which do not pertain to P2 cancel, leaving only data about P2. In some embodiments, an agent decodes the summary response and sends only the data that pertains to the inquiry to the inquirer.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION OF A SPECIFIED EMBODIMENT

Figure 1:
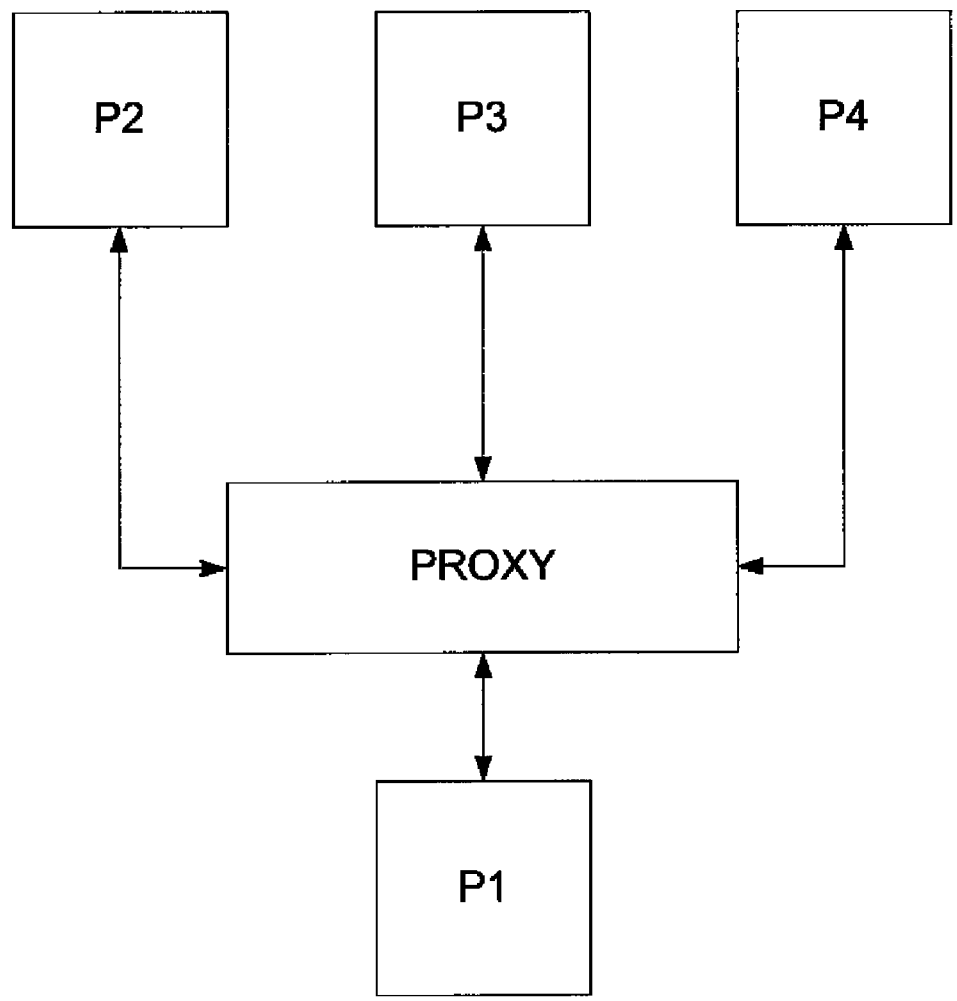
FIG. 1 is a diagrammatic delineation describing the relative knowledge of each of the parties.
Figure 2:
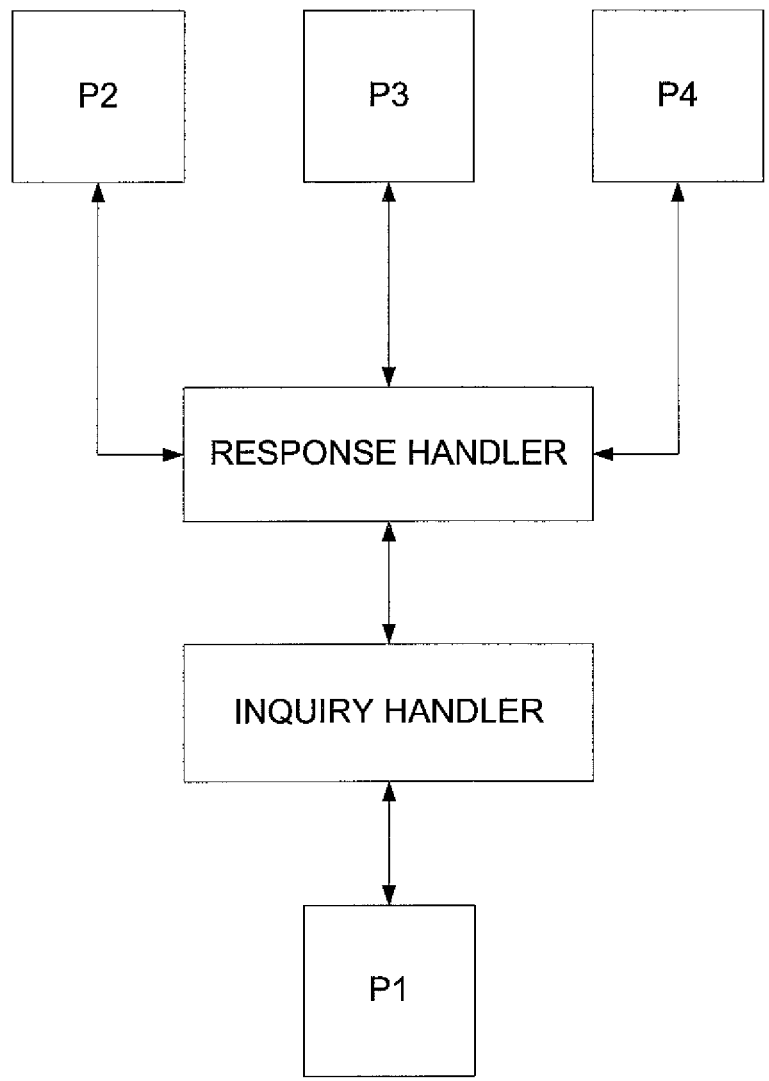
FIG. 2 is a diagrammatic delineation of the privacy preserving protocol of the embodiments of the present invention.

The embodiments of the present invention present the protocol of an agent assistant approach to achieve privacy preserving reputation inquiry via a pair of mediator proxies—referred to as an inquiry handler and a response handler. Fields where the subject invention finds particular utility includes IT (Information Technology) security and financial/credit rating services.

While the embodiments of the present invention utilize standard cryptographic application and broadcasting to achieve inquirer-responder anonymity and content confidentiality, the invention is distinguished from the prior art in at least three aspects.

First, at least two mediator proxies are introduced to achieve a "separation of duty." Specifically, a first mediator proxy (inquiry handler) receives the inquiry, and a second mediator proxy (response handler) receives inquiry responses from responders. The first mediator proxy relays it to all participating parties so that each of the m responders become indistinguishable from the remaining n−m participants in a peer-to-peer environment, thus achieving the k-anonymity for privacy preserving and content confidentiality, which overcomes any disadvantage existing in the prior art. Importantly, the mediator proxies do not get involved in the encryption process. Therefore, the mediator proxies have no access to the information about the identity of the responder(s), which is protected in the encrypted inquiry. This provides the distinct advantage of providing an additional layer of privacy protection due to the encryption of the responder identity into the inquiry vector, which overcomes another disadvantage existing in the prior art. Furthermore, the mediator proxies are completely trustworthy. As the phrase is used in this specification, a mediator proxy is considered trustworthy if, even when it is compromised, it can guarantee three conditions: (1) the anonymity of the identity of the responders and the target being inquired; (2) the privacy of the content of an inquiry and a response; and (3) the boundary limit of the reputation summary with no possibility of combining the response of multiple inquiries to reverse engineer the reputation rating of an individual responder.

Second, a data structure hashing the identity of peers is applied to encode a "position reference" for each trusted peer referee into a unique index of an inquiry vector. Homomorphic encryption is then applied to the inquiry. The advantage of homomorphic encryption is its mathematical property allowing a responder to respond directly. In other words, a responder could respond to the encrypted inquiry without the inquirer sharing the decryption key, which is typically required to reveal the inquiry content. This overcomes the disadvantage about the necessity of an infrastructure for encryption/decryption key management and distribution.

Third, the embodiments of the present invention enable the mediator proxy handling the response to introduce an acceptable random noise to an encrypted response and introduce a personal agent to relay only the "need-to-know" response. Consequently, even if an inquirer crafts an inquiry with an attempt to compromise the privacy of a responder, reverse engineering the specific response of a specific responder would not be successful, which overcomes still another disadvantage of the prior art.

To facilitate its description, the invention will be described in the context of a hypothetical, four-party scenario. It should be understood that this description is for illustrative purposes only and should not be construed to limit the invention. Generally, given n participants in a reputation system, each party wants to know the reputation of each other. When party P1, is interested in the reputation of party, P2, then party P1 will select m "trusted colleagues" from the group of n referees. These "trusted colleagues" are individualized referees for proving feedbacks about party P2. The reputation of party P2, based on the m(<n) referees selected by party P1, is derived based on the boundary limit of a linear sum of the weighted numerical scores of m referees.

In the present hypothetical scenario, assume there are four parties P1, P2, P3, and P4, i.e., n=4. Party P1 (the inquirer) wants to know about the reputation of party P2 (the target party). Each of the parties has a rating score concerning each of the other parties. The target party does not know the inquirer is asking about him/her, and the target party certainly does not know from whom the inquirer will solicit the opinion. From the inquirer's perspective, he/she has the choice of asking only party P3(m=1) or P4(m=1) or both (m=2). In each of these three cases, parties P3 and P4 do not know that the solicitation is from the inquirer. The precise information that is being retrieved is hidden from P3 and P4 such that they do not know that the inquirer is asking about the target party (P2).

To prevent data from being compromised several procedures are used, namely, (1) algebraic transformation of an intended inquiry in combination with an enhanced homomorphic encryption satisfying E(k, m1+m2)=E(k,m1)E(k,m2), and $[E(k,m)]^c=E(k,mc)$, where k is an encryption key, and the addition, product, and exponent are standard arithmetic operators, and (2) employing at least two mediator proxies to achieve separation of duty;

Algebraic Transformation and Homomorphic Encryption

For example P1 may define an inquiry 2×SC+3×SD, where SC and SD are the rating about P2 by P3 and P4, respectively. Instead of encrypting and posting the inquiry directly, two queries are composed in such a way that some linear combination of the two queries results in the cancellation of all terms except the weighting factors for SC and SD. For example, consider the following two inquiry vectors relating to the original inquiry in form of $IV_2-2\times IV_1$:

$IV_1=(2.3\ 4.2\ 1.3\ 2.4\ 9.6\ 2.7\ 8.3\ 7.6\ 2.9\ 6.6\ 3.2\ 4.3\ 5.1\ 9.9\ 1.7\ 2.4)^T$ $IV_2=(4.6\ 8.4\ 2.6\ 4.8\ 19.2\ 5.4\ 16.8\ 15.2\ 5.8\ 15.2\ 6.4\ 8.6\ 10.2\ 22.8\ 3.4\ 4.8)^T$

In the above example, each of the elements of $IV_2$ is double the corresponding element in IV except for the tenth and fourteen elements. When a decryption function is applied such that the two vectors are combined linearly in accordance with the original encryption function then all elements, except for the tenth and fourteen, are canceled and the original weighting factors of SC and SD (2.0 and 3.0 respectively) are obtained. The aforementioned example is a simple linear combination (the values of the elements were multiplied by two), but exponential encryption for the elements in the linear combination is also possible.

In some embodiments of the present invention, instead of using the exponential encryption $k^m$, an enhanced version of homomorphic encryption takes the form of $E(k,a,m)=k^{am}$, where (k, a) are encryption keys and m is the message to be encrypted. Suppose two different encryption keys (k1=2.92, a1=3.1) and (k2=3.29, a2=2.9) are used for $I_{V1}$ and $I_{V2}$, respectively, the encrypted inquiry vectors will appear to have no regular patterns among the numbers in the vectors.

Let $E(2.92,3.1,R^{IV1})$ and $E(3.29,2.9,R^{IV2})^2$ be the encrypted response vectors for $IV_1$ and $IV_2$, respectively, and rnd1 and rnd2 are the corresponding random noise. The following linear combination allows the reconstruction of the boundary limit for the summary response to the original inquiry (2×SC+3×SD):

$$\Sigma_{i=10,14} \text{Log}_{3.29}(E(3.29,2.9,R^{IV2})_i)/2.9 - 2\cdot[\text{Log}_{2.92}(E(2.92,3.1,R^{IV1})_i)/3.1] = (2\cdot SC+3\cdot SD)+(2\cdot SC\cdot \text{rnd1}+ 3\cdot SC\cdot \text{rnd2})$$

In general, an inquiry on the reputation of a party from a group of referees can be decomposed into queries of which some linear combination results in the original inquiry.

A Pair of Mediator Proxies to Achieve Separation of Duty

The inquirer sends an encrypted inquiry to one mediator proxy—referred to as the inquiry handler. The inquiry handler receives the encrypted inquiry and distributes it to the responding parties. The other mediator proxy—referred to as the response handler—receives encrypted response from the other parties and transmits the responses to the original inquirer. In addition, the inquiry handler also informs the responding parties about the identity of the response handler as well as the location to which the response handler should send the summary response (i.e. the inquirer).

Description of Process

Each party (Pi) maintains an n×1 (n≧i) vector ($R^{Pi}$) storing the rating score of each peer with the $i^{th}$ entry being 0 (because an individual entity does not rate itself). Each party also has access to a first function (make_RV) that constructs the rating vectors as well as access to a second function (make_Response) that constructs a vector that includes the response. These two functions are further described as follows:

make_RV($R^{Pi}$, i)=$T_i \times R^{Pi}$ where $T_i$ is a transformation matrix of size n²×n for mapping $R^{Pi}$ of size n×1 to rating vector $V^{Pi}$ of size n²×1 with zero padding, and $T_i^T=[Z_{n\times n(i-1)}\ I_{n\times n}\ Z_{n\times n(n-i)}]$ is composed of a zero matrix of size n×n(i−1), an identity matrix of size n×n, and another zero matrix of size n×n(n−i)

make_Response($V^{Pi}$, $IV^{Pk}$)=$\Pi_{j=1}^{n\times n}(k^{nj})^{vj}$ vj is $j^{th}$ entry in the $V^{Pi}$, and $k^{nj}$ is the $j^{th}$ entry in $IV^{Pk}$ Using the make_Response function, each peer responder generates the response by raising each element of each encrypted inquiry vector to the power of the rating score.

Inquirer Pi defines the target party Pj, the set of "trusted peer referees" Ri_j={Pk|Pk is a referee selected by Pi to offer an opinion on Pj}, and a weighting factor wj_k associated with each Pk in Ri_j. In other words, the reputation inquiry (on Pj), denoted by $RI_{Pj}$, can be mathematically represented by a $n^2 \times 1$ vector with the $n(k-1)+j$ entry being wj_k, and all other entries being zero, where Pk ∈ Ri_j, and n is the number of peers in the reputation system environment.

Denoting the number of referees in Ri_j by |Ri_j|, the inquirer composes |Q| numbers of elements $Q_1 \ldots Q_{|Q|}$ satisfying one condition; there exists a linear combination $\Sigma_{i=1}^{|Q|} a_i Q_i = RI_{Pj}$ for some $a_i$s s. The coefficients $a_1$s are determined algebraically to retro-fit the condition $\Sigma_{i=1}^{|Q|} a_i Q_i = RI_{Pj}$. For each $Q_v$ where v=1 . . . |Q|, the inquirer defines an encryption key $(k_v, a_v)$. Each element $Q_v$ is then encrypted using $(k_v, a_v)$ to compose the inquiry vector $IV_v$; i.e., $E(k_v, a_v, Q_v) \rightarrow IV_v$ for v=1 . . . |Q|.

Upon receiving an inquiry vector, the inquiry handler broadcasts the encrypted inquiry vector to all parties (but not to the response handler), and notifies the response handler where to send the summary response. Each party Pi(i=1 . . . n except the inquirer) calls the function make_RV($R^{Pi}$,i) (defined in Step 1 above) to compose its rating vector $V^{Pi}$ and subsequently make_Response($V^{Pi}$, $IV^{Pk}$) to compose a response vector RV_Pi. Once the rating vector and response vectors have been constructed, they are transmitted to the response handler.

Upon receiving the response from all parties, the response handler combines the responses to generate a summary response vector $S\_IV_v = \Pi_{Pi} RV\_Pi$. Afterwards, the response handler composes a final summary response by adding a random noise $S\_IV_v^{rnd}$ to the response so that the finalized response becomes $S\_IV_v^{(1+rnd)}$, where rnd is an "unpredictable" value for each query from a random number generator RND(seed, param-val) with a seed value, and a distribution characterized by the set of statistical parameters defined in param-val over the range of random values $[rnd_{min} \ldots rnd_{max}]$. The finalized summary response $S\_IV_v^{(1+rnd)}$, together with the information about the random number generator, is transmitted by the response handler to the inquirer Pi.

Upon receiving the encrypted summary response for each $IV_v$, the inquirer Pi decrypts the final response using the $(1/a_v)\text{Log}_{kv}(\bullet)$ operator to obtain the unencrypted response $R\_Q_v$ for the query $Q_v$, where v=1 . . . |Q|. After deriving the responses $R\_Q_1 \ldots R\_Q_{|Q|}$, the linear combination $\Sigma_{i=1}^{|Q|} a_i (R\_Q_i)_j$ (an example is shown in Example 1 below under the heading "Construct two queries as a linear combination") is constructed using the relevant $j^{th}$ entries in $R\_Q_i$ to obtain a boundary limit for the reputation inquiry $RI_{Pj}$ about Pj.

EXAMPLE 1

An example for the improved peer-to-peer communication is presented. Consider a five-party (P1 . . . P5) environment in which each party maintains the following rating scores.

Establish Rating Scores

Each of the five parties establishes a rating score wherein each of the other parties is rated. The party does not rate itself.

$R^{P1} = (0\ 2.6\ 3.7\ 1.7\ 6.9)^T\ R^{P2} = (1.3\ 0\ 2.6\ 5.1\ 4.7)^T$ $R^{P3} = (3.2\ 2\ 4.0\ 4.3\ 5.2)^T\ R^{P4} = (2.7\ 3.2\ 4.5\ 0\ 2.3)^T$ $R^{P5} = (4.5\ 4.2\ 3.1\ 2.3\ 0)^T$

Furthermore, the matrix representation of $T_2^T$ in make_RV ($R^{P2}$, 2) is shown below for illustration purposes:

|  |  | Column |  |  |  |  |  |  |
|---|---|---|---|---|---|---|---|---|
|  |  | 1 . . . 5 | 6 | 7 | 8 | 9 | 10 | 11 . . . 25 |
| Row | 1 | 0 . . . 0 | 1 | 0 | 0 | 0 | 0 | 0 . . . 0 |
|  | 2 | 0 . . . 0 | 0 | 1 | 0 | 0 | 0 | 0 . . . 0 |
|  | 3 | 0 . . . 0 | 0 | 0 | 1 | 0 | 0 | 0 . . . 0 |
|  | 4 | 0 . . . 0 | 0 | 0 | 0 | 1 | 0 | 0 . . . 0 |
|  | 5 | 0 . . . 0 | 0 | 0 | 0 | 0 | 1 | 0 . . . 0 |

From these rating scores, a rating vector may be generated by make_RV. An example rating vector for P2 is shown.

$\text{make\_RV}(R^{P2}, 2) = T_2 \times R^{P2} = [0\ 0\ 0\ 0\ 0\ 1.3\ 0\ 2.6\ 5.1\ 4.7\ 0 \ldots 0]^T$ Weighing the Responses In the present example inquirer P3 solicits the reputation of target party P1 from responders by P2 and P5. Then Ri_j=R3_1={P2 P5} for i=3 and j=1. Further assume inquirer P3 assigns a weighting factor of 0.8 to the response of P2 and 0.2 for the response of P5, i.e., w1_2=0.8 and w1_5=0.2. The reputation inquiry $RI_{P1}$ is then expressed mathematically as a $5^{2 \times 1}$ vector shown below:

$RI_{P1} = [0\ 0\ 0\ 0\ 0\ 0.8\ 0\ 0\ 0\ 0\ 0\ 0\ 0\ 0\ 0\ 0\ 0\ 0\ 0\ 0\ 0.2\ 0\ 0\ 0\ 0]^T$

Note that the only non-zero values are wj_k at the $n(k-1)+j$ entry, with n=5, j=1, and k=2,5.

Construct Two Queries as a Linear Combination

In this example, $RI_{P1}$ is expressed in terns of the linear combination of two queries defined by P3 as shown below:

$$Q_1 = \begin{bmatrix} 0.997 & 0.611 & 0.266 & 0.84 & 0.376 \\ 0.28 & 0.009 & 0.276 & 0.588 & 0.838 \\ 0.485 & 0.744 & 0.458 & 0.744 & 0.599 \\ 0.735 & 0.572 & 0.152 & 0.425 & 0.517 \\ 0.31 & 0.169 & 0.492 & 0.7 & 0.148 \end{bmatrix}^T$$

$$Q_2 = \begin{bmatrix} 0.204 & 0.125 & 0.055 & 0.172 & 0.077 \\ -1.092 & 0.002 & 0.057 & 0.12 & 0.172 \\ 0.099 & 0.152 & 0.094 & 0.153 & 0.123 \\ 0.151 & 0.117 & 0.031 & 0.087 & 0.106 \\ -0.225 & 0.035 & 0.101 & 0.143 & 0.03 \end{bmatrix}^T$$

where $RI_{P1} = 0.142 \times Q_1 - 0.693 \times Q_2$.

Encrypt the Two Queries

The queries Q1 and Q2 are encrypted using the encryption keys defined earlier (i.e., k1=2.92, a1=3.1 for $Q_1$, and k2=3.29, a2=2.9 for $Q_2$) follows:

$$IV_1 = \begin{bmatrix} 27.42 & 7.624 & 2.421 & 16.294 & 3.485 \\ 2.535 & 1.03 & 2.5 & 7.05 & 16.159 \\ 5.007 & 11.829 & 4.578 & 11.857 & 7.315 \\ 11.492 & 6.696 & 1.655 & 4.106 & 5.572 \\ 2.8 & 1.753 & 5.124 & 10.222 & 1.632 \end{bmatrix}^T$$

-continued $$IV_2 = \begin{bmatrix} 2.025 & 1.541 & 1.207 & 1.812 & 1.305 \\ 0.023 & 1.006 & 1.216 & 1.516 & 1.809 \\ 1.409 & 1.693 & 1.383 & 1.693 & 1.528 \\ 1.682 & 1.499 & 1.113 & 1.351 & 1.442 \\ 0.46 & 1.127 & 1.416 & 1.641 & 1.11 \end{bmatrix}^T$$

Note that the $k^{th}$ entry in $IV_1$ is $2.92^{3.1 \cdot Q1k}$, where $Q1_k$ is the $k^{th}$ entry in Q1. Similarly, the $k^{th}$ entry in $IV_2$ $3.29^{2.9 \cdot Q2k}$, where $Q2_k$ is the $k^{th}$ entry in Q2.

Action of Inquiry Handler and Responders

After the inquiry handler receives $IV_1$ and $IV_2$ from the inquirer, the inquiry handler notifies the response handler that the summary response, when compiled, is to be sent to the inquirer. In addition, the inquiry handler also notifies P1, P2, P4, and P5 to send the response to the response handler. The encrypted vectors $IV_1$ and $IV_2$ are then broadcasted to P1, P2, P4, and P5 by the inquiry handler. The inquirer (P3) is the only party who does not receive the vectors. The functions make_RV($R^{Pi}$,i) and make_Response($V^{Pi}$, $IV^{Pk}$) are then called by each party to compose a response vector RV_Pi for each of the $IV_j$, i=1,2,4,5 and j=1,2. To maintain the focus on only the most relevant information, only one such response from P2 for $IV_1$ is shown:

| 1 | 1 | 1 | 1 | 1 |
|---|---|---|---|---|
| 3.351 | 1 | 10.836 | 2.12E + 04 | 4.78E + 0.5 |
| 1 | 1 | 1 | 1 | 1 |
| 1 | 1 | 1 | 1 | |
| 1 | 1 | 1 | 1 | 1 |

Actions of Response Handler

After the response handler receives the responses from parties P1, P2, P4, P5, a summary response vector $S\_IV_v = \Pi_{Pi} RV$ is generated for each query (i.e., v=1.2). Different levels of the random noise are then added to the response for each query. Below shows an example of the final response vectors for the queries:

Response for $IV_1 = S\_IV_1^{(1+rnd)}$ (where rnd = 0.15) =

$$\begin{bmatrix} 1 & 434.266 & 43.071 & 234.162 & 20076.443 \\ 4.017 & 1 & 15.49 & 94314.61 & 3.399E + 06 \\ 1 & 1 & 1 & 1 & 1 \\ 1961 & 1093.74 & 13.537 & 1 & 94.033 \\ 206.266 & 15\ldots048 & 338.654 & 467.975 & 1 \end{bmatrix}^T$$

Response for $IV_2 = S\_IV_2^{(1+rnd)}$ (where rnd = 0.13) =

$$\begin{bmatrix} 1.000 & 3.566 & 2.198 & 3.133 & 7.956 \\ 0.004 & 1.000 & 1.774 & 10.997 & 23.290 \\ 1.000 & 1.000 & 1.000 & 1.000 & 1.000 \\ 4.889 & 4.326 & 1.725 & 1.000 & 2.588 \\ 0.019 & 1.764 & 3.382 & 3.623 & 1.000 \end{bmatrix}^T$$

Decryption of Summary Response

Upon receiving the response for $IV_v$(v=1,2), the inquirer P3, decrypts the response using the $(1/a_v)\text{Log}_{kv}(\bullet)$ operator on each element in the summary response vector $S\_IV_v^{(1+rnd)}$ (v=1,2), and the following results are obtained:

$$R\_Q_1 = \begin{bmatrix} 0 & 1.828 & 1.133 & 1.642 & 2.982 \\ 0.419 & 0 & 0.825 & 3.448 & 4.527 \\ 0 & 0 & 0 & 0 & 0 \\ 2.282 & 2.106 & 0.784 & 0.000 & 1.368 \\ 1.604 & 0.816 & 1.754 & 1.851 & 0 \end{bmatrix}^T$$

$$R\_Q_2 = \begin{bmatrix} 0 & 0.368 & 0.228 & 0.331 & 0.601 \\ -1.612 & 0 & 0.166 & 0.694 & 0.912 \\ 0 & 0 & 0 & 0 & 0 \\ 0.460 & 0.424 & 0.158 & 0 & 0.275 \\ -1.147 & 0.164 & 0.353 & 0.373 & 0 \end{bmatrix}^T$$

Let $r\_q1_i$ and $r\_q2_i$ be the $i^{th}$ entry in $R\_Q_1$ and $R\_Q_2$, respectively, where i=1 . . . 25. Note that only two terms $r\_q1_i$ and $r\_q2_i$, are relevant to the original inquiry, which are i=6 and i=21. The sum of these terms, $\Sigma_{i=6,21}(0.142 \cdot r\_q1_i - 0.693 \cdot r\_q2_i) = 2.199$ produces an upper boundary limit for the query $RI_{P1}$, which inquires into the reputation of P1 based on the linear combination of the rating by P2 (i.e., 1.3) with a weighting factor 0.8, and the rating by P5 (i.e., 4.5) with a weighting factor 0.2. It should be noted that $\Sigma_{i=6,21}[(0.142 \cdot r\_q1_i/1.15) - (0.693 \cdot r\_q2_i/1.13)]$ is the exact linear combination of the rating information being sought (i.e., 0.8× 1.3+0.2×4.5=1.94), whereas the scaling 1.15 and 1.13 are from (1+rnd) and introduced by the response handler to query 1 and 2, respectively.

EXAMPLE 2

In an experimental study, signature-based intrusion detection alerts over a period of three days from sensors of six subnets were used. Each intrusion detection sensor was modeled as an agent for cross sharing information to develop a holistic view of the security status. Due to security implication, the stake holders of the intrusion detection logs preferred to conceal their identity even though they were interested in cross sharing information in their security logs. As such, the proposed privacy preserving reputation system approach was applied to achieve intrusion detection information sharing.

Over the period of the three-day preliminary study, 4618 alerts were generated by the six intrusion detection sensors. 3.68% of the alerts had a source IP indicating an origination from internal, i.e., by the source and destination IP addresses and ports. Based on the source IP shown in an alert, the Internet Service Provider (ISP) who handled the routing of the traffic originated from the source IP was located. A reverse look up on the country origin of the ISP was then performed.

A total of 16 countries were found in the alerts. The "creditability score" (reputation) of each country was derived based on the potential threat of the traffic activities, as grouped by the country origin logged in the alerts. In this experiment, a two-point penalty was assigned if a destination port is less than 1024, which indicated a potential anomaly of server-side contact as detected by the intrusion detection sensor. One-point penalty was assigned if the destination port in an alert is above 1024. For each IDS sensor, a threat rating score for each one of the 16 countries was derived based on the normalized sum of the penalty points from alerts with a source IP handled by an ISP of the corresponding country, whereas the normalization factor was twice the total number of alerts as generated by the IDS sensor. The creditability score of a country was the negative of the threat score. As such, the creditability score of a country, as assigned by an IDS sensor was always between 0 and −1. As seen by an IDS sensor, a creditability score of zero means that the corresponding country has not generated network traffic activities, which alarmed the sensor. On the other hand, a creditability score (close to) −1 means that the network traffic activities originated from a country were considered to have posed the most serious threat. A 16×1 vector was created by each IDS sensor to maintain the reputation score of the 16 countries, whereas the vector indices are the result of a no-collision hashing taking a country name as an input.

In this experiment, the participants of the peer-to-peer communication are the six IDS sensors, and each participant posts two queries to the mediator proxies. The objective of each IDS sensor is to determine whether the cumulative threat as measured by the sum of the threat score of the worst three "offenders" (i.e., countries with the three lowest creditability scores), was typical to other IDS sensors. Although one query is sufficient, two queries were posted so that an upper and a lower boundary can be obtained. In this experiment, a random number generator with a uniform distribution was used by the response handler. The random number generator is used to generate a random value between zero and one in dealing with the query, thus resulting in a lower boundary for the response to the query. Likewise, a random value (>1) was generated for the query. This resulted in an upper boundary for the response to the query.

Figure 4:
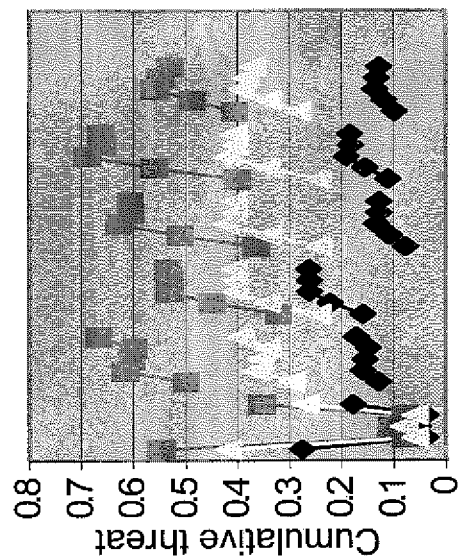
FIG. 4 is a tabulation of the cumulative threat of responders.
Figure 3:
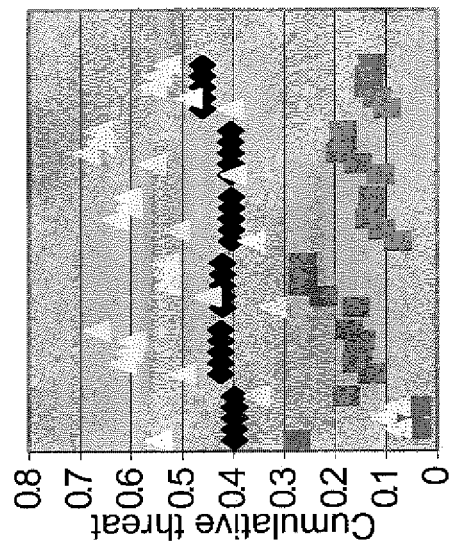
FIG. 3 is a tabulation of the boundary interval of response.

FIG. 3, which is a tabulation of the boundary interval of response, shows the boundary interval of the query response in relation to the threat score of the inquirer. FIG. 4, which is a tabulation of the cumulative threat of responders, shows the upper (U.B.) and lower (L.B.) boundary of the threat score of each country derived by each IDS sensor, as well as the actual value. FIG. 3 shows the relevancy and accuracy of the response, while FIG. 4 shows the degree of privacy preserving of the creditability score information of each IDS sensor.

Agent-Assistant for Privacy Preserving

Figure 5:
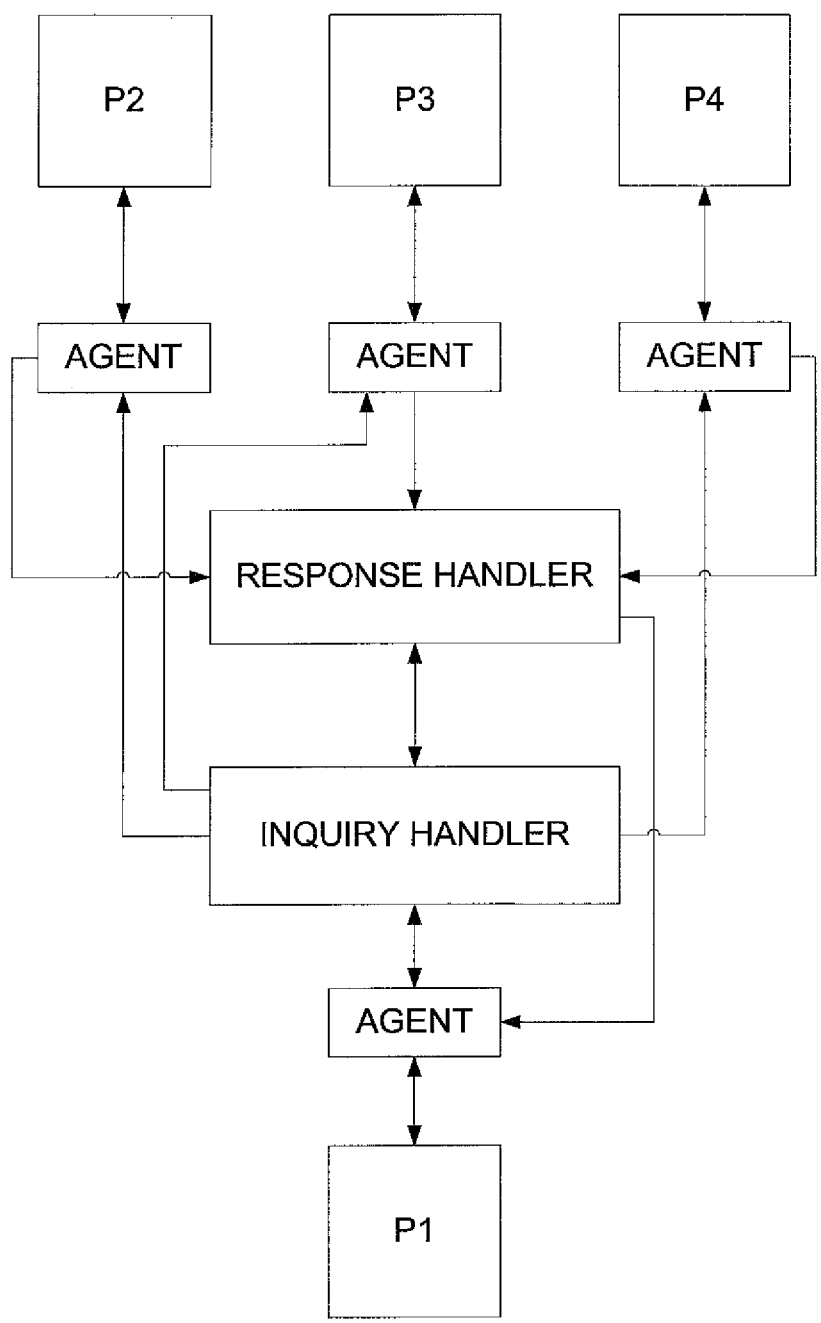
FIG. 5 is a diagrammatic delineation of an agent assistant reputation inquiry embodiment of the present invention.
Figure 6A:
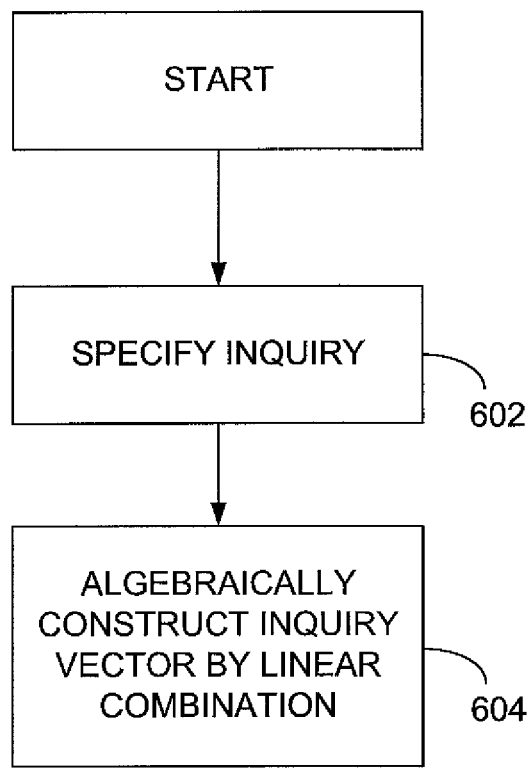
FIGS. 6A to 6F are a flowchart of the method for preserving privacy of a reputation inquiry in a peer-to-peer communication environment of the embodiments of the present invention.
Figure 6B:
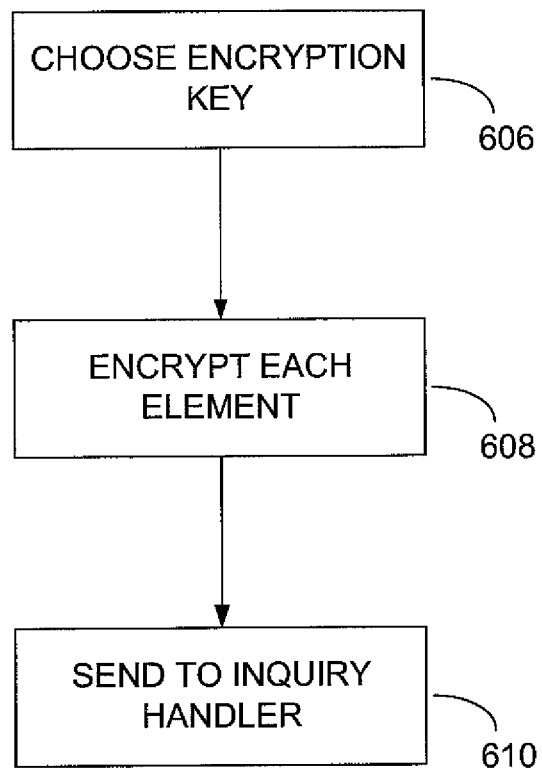
Figure 6C:
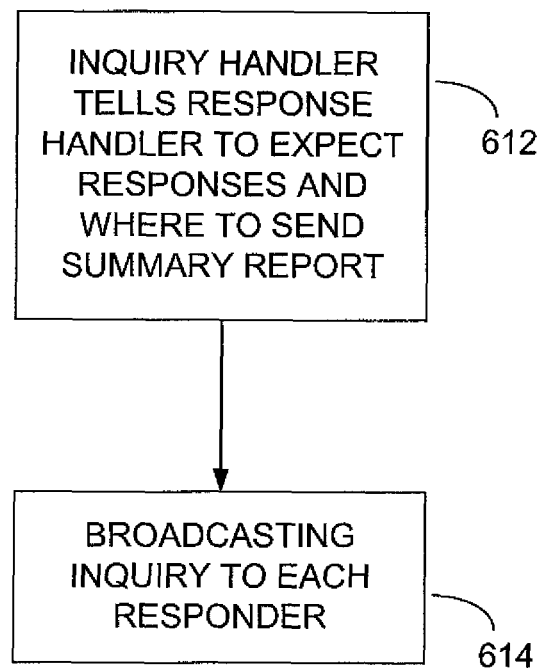
Figure 6D:
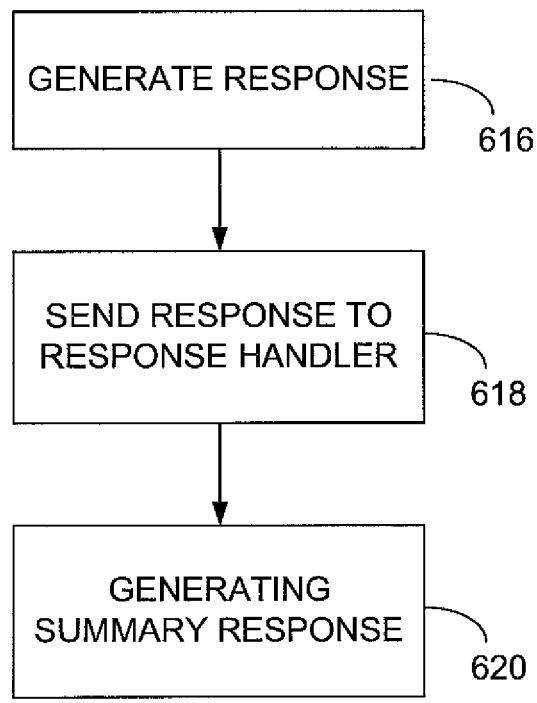

FIG. 5 depicts an agent-assistant embodiment for the privacy preserving reputation inquiry. FIG. 5 shows the steps of interaction among the inquirer, the pair of mediator proxies, and the responders using the previous example, i.e., P1 solicits the reputation of P2 from P3 and P4. The protocol for agent assistant privacy preserving reputation inquiry shown in FIG. 5 and FIGS. 6A-6F, which are a flowchart of reputation inquiry in a peer-to-peer communication environment of the embodiments of the present invention, includes the following steps:

In FIGS. 6A to 6F an inquirer specifies an inquiry for its agent in step 602. Thereafter, the agent derives new inquiry vector(s) algebraically that constructs the inquiry as an inquiry vector through some linear combination in step 604. The agent also defines the encryption key in step 606. In step 610, the agent applies homomorphic encryption to encrypt each element in each of the new inquiry vector(s). The agent sends each element, one-by-one, to the inquiry handler in step 610. In step 612 the mediator proxy/inquiry handler, upon receiving an inquiry, notifies the response handler to anticipate incoming responses and a destination of the inquirer for the summary response to be sent to. As shown in FIG. 6C the mediator proxy/inquiry handler broadcasts the encrypted inquiry vector(s) to each peer responder in step 614. In turn, each peer responder generates the response by raising each element of each encrypted inquiry vector to the power of the rating score using the make_Response function in step 616 as described below:

$$\text{make\_Response}(V^{Pi}, IV^{Pk}) = \Pi_{j=1}^{n \times n} (k^{mj})^{vj}$$

vj is $j^{th}$ entry in the $V^{Pi}$, and $k^{mj}$ is the $j^{th}$ entry in $IV^{Pk}$ As shown in step 618 each peer responder sends the response to the mediator proxy/response handler The mediator proxy/response handler, in step 620, upon receiving the replies for query v, combines the responses to generate a summary response $S\_IV_v = \Pi_{Pi} RV\_Pi$ by multiplying together the individual responses RV_Pi from the parties Pis.

Figure 6E:
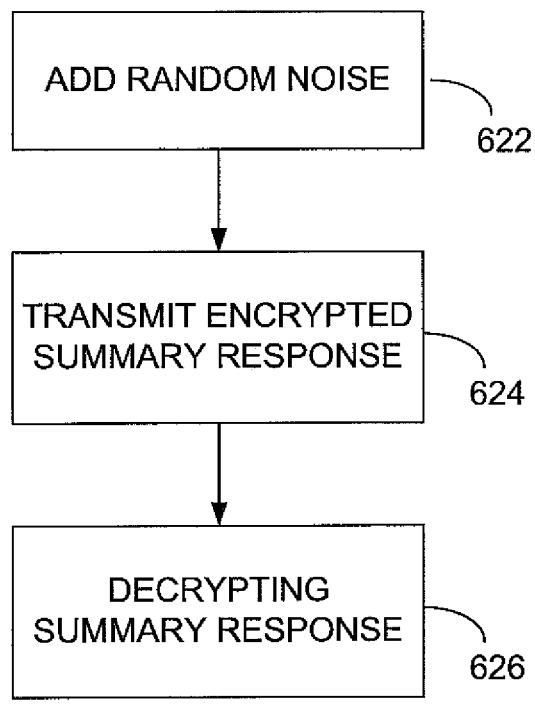
Figure 6F:
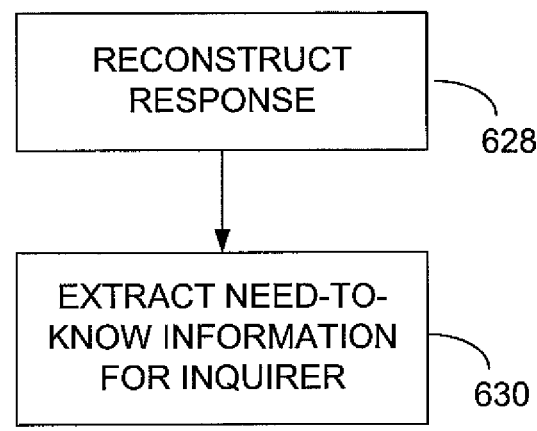

In FIG. 6E the mediator proxy/response handler introduces a random noise $S\_IV_v^{rnd}$ to the response so that the final response becomes $S\_IV_v^{1+rnd}$ in step 622. Thereafter, in step 624, the mediator proxy/response handler sends the summary response to the agent of the inquirer using the destination information provided by the inquiry handler in step 612. In FIG. 6F, the agent decrypts the response upon receiving the summary response for the encrypted inquiry vector(s) in step 626. As shown in step 628, the agent composes the linear combination of the response vectors to reconstruct the response vector to the original inquiry. In step 630 the agent extracts only the need-to-know boundary limit information to send to the inquirer.

Conclusions

The encryption key is never shared by the inquirer. Without the secret key, one could not tell from the inquiry vector the specific inquirer who is the target and who is/are the referee(s). Furthermore, the inquiry handler broadcasts the inquiry to all parties, thereby eliminating the possibility of revealing the identity of the intended receiver(s). Consequently, the privacy of the responders and the target being inquired is protected—the first condition of a trustworthy mediator proxy described earlier. In addition, the responses from the referees are unintelligible to other peers and the response handler because the inquiry handler does not share the original encrypted inquiry vector(s) $IV_i$. Only the inquirer can decrypt the response as the secret key holder—the second condition of a trustworthy mediator proxy. Finally, the introduction of the random noise by the response handler eliminates the possibility of the inquirer making multiple identical inquiries to algebraically re-derive the specific response of each individual referee, thereby the privacy of the response of a referee is also protected—the third condition of a trustworthy mediator proxy.

Although the peer-to-peer communication protocol of the embodiments of the present invention delivers the response to a reputation inquiry with an assurance on the stipulated privacy preserving conditions, there is a vulnerability that has not yet been addressed. Referring to the IT security example above, there is additional information in the response vectors $R\_Q_1$ and $R\_Q_2$, i.e., the boundary limit of the ratings of all individuals by all parties. For example, the inquirer P3 knows the second entry in $Q_1$ is 0.611, or $(2.92^{3.1 \cdot 0.611})^{v12(1+rnd)} =$ 434.266 (the second entry observed in the response for $IV_1$, i.e., $S\_IV_1^{(1+rnd)}$ because k1=2.92, a1=3.1, where v12 is the rating of P2 by P1. In other words, v12(1+rnd)=($\log_{2.92}$ 434.266)/(3.1·0.611), or v12≤$\log_{2.92}$ 434.266(3.1·0.611)=2.9924, which is 15% more than the actual rating of P2 and P1 as introduced by the mediator proxy.

The risk of the vulnerability just mentioned is a potential exploit if the statistical behavior of the random number generator allows reverse identification, thus the possible value(s) of rnd. This may allow the inquirer to infer the ratings of all individuals by all parties with a certain level of confidence. Yet the quality of an inquiry response suffers if the information about the statistical behavior of the random number generator is concealed excessively. An alternative is an independent entity acting as an agent on behalf of the inquirer to receive the encrypted summary response from the mediator proxy and to strip the additional information in the response vectors prior to passing to the inquirer only the necessary information related to a reputation inquiry. One method to strip the additional information in the response vectors is for the agent to engage the inquirer in a cryptographically enabled one-out-of-n oblivious transfer. One-out-of-n oblivious transfers are well known in the art. Such a transfer process enables the inquirer and agent to exchange multiple pieces of data, with only the need-to-know data being decipherable by the inquirer. The extraneous data is unintelligible to the inquirer.

The embodiments of the present invention present a privacy preserving peer-to-peer communication protocol for reputation inquiry. It involves a pair of trustworthy mediator proxies and guarantees three conditions: (1) the anonymity of the identity of the responders and the target being inquired; (2) the privacy of the content in an inquiry and a response; and (3) the boundary limit of the reputation summary, with no possibility of combining the response of multiple inquiries to reverse engineer the reputation rating of an individual responder.

An algebraic transformation and an enhanced homomorphic encryption is used to protect inquiry privacy from the threat of a convert channel existing in any communication process permitting multiple queries. An example illustration has been presented to show the mechanism of each step and has been used to discuss its strength and its limitation. Finally, the extension of the improved privacy preserving communication protocol is described to incorporate agent assistants to ascertain the delivery of only need-to-know summary response.

While the invention has been described with reference to specified embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for preserving privacy of a reputation inquiry in a peer-to-peer computer networking communication environment with an inquiry handler, a response handler, a plurality of parties including at least one responder, an inquirer, an inquiry target, wherein the responder has a rating score that rates the inquiry target, the method comprising the steps of:
generating an inquiry vector about the inquiry target, wherein the inquiry vector has a plurality of elements and the generating step is performed by the inquirer;
applying homomorphic encryption, by the inquirer, to each element of the inquiry vector and specifying a corresponding encryption key, thereby producing an encrypted inquiry, wherein the encryption key is known by the inquirer and is not known by the inquiry handler, the response handler, the inquiry target or the responder, the inquiry handler and the response handler being separate entities, thereby achieving a separation of duty between the inquiry handler and the response handler;
sending the encrypted inquiry, across a computer network, to the inquiry handler;
broadcasting the encrypted inquiry to the responder, wherein the broadcasting step is performed by the inquiry handler,
identifying the response handler to the responder such that each responder can send a response to the response handler, the step of identifying the response handler being performed by the inquiry handler;
responding by raising each element of the encrypted inquiry vector by a power equal to the rating score, thereby generating a response to the inquiry, wherein the raising step is performed by the responder;
transmitting the responses, across a computer network, from the responder to the response handler;
producing a summary response, wherein the step of producing is performed by the response handler;
sending the summary response from the response handler to the inquirer; and
decrypting the encrypted summary response using a decryption key;
wherein the step of responding responds by constructing a rating vector make $_{13}RV(R^{Pi},i)=T_i \times R^{Pi}$ wherein $R^{Pi}$ is a vector storing a rating score for each of the parties $P_i$, where $T_i$ is a transformation matrix of size $n^2 \times n$ for mapping $R^{Pi}$ of size $n \times 1$ to rating vector $V^{Pi}$ of size $n^2 \times 1$ with zero padding, and $T_i^T = [Z_{n \times n(i-1)} \ I_{n \times n} \ Z_{n \times n(n-i)}]$ is composed of a zero matrix of size $n \times n(i-1)$, an identity matrix of size $n \times n$, and another zero matrix of size $n \times n(n-i)$, and then applying a response function make_Response$(V^{Pi}, IV^{Pk}) = \Pi_{j=1}^{n \times n}(k^{mj})^{vj}$, where vj is $j^{th}$ entry in the $V^{Pi}$, and $k^{mj}$ is the $j^{th}$ entry in $IV^{Pk}$, to raise each element of the encrypted inquiry vector by the power equal to the rating score.

2. A method for preserving privacy of a reputation inquiry in a peer-to-peer computer networking communication environment with an inquiry handler, a response handler, a plurality of parties including at least one responder, an inquirer, and an inquiry target, wherein the responder has a rating score that rates the inquiry target, the method comprising the steps of:
generating, by the inquirer, a first and second query vector about the inquiry target, with respective first and second elements, wherein the first query vector and the second query vector may be algebraically combined according to a predetermined algebraic operation to form an inquiry vector;
applying homomorphic encryption to each first element and each second element of the first and second query vector and specifying a corresponding first and second encryption key, thereby producing a first and second homomorphically encrypted inquiry, wherein the first and second encryption keys are known by the inquirer and are not known by the response handler, the inquiry target or the responder, the inquiry handler and the response handler being separate entities, thereby achieving a separation of duty between the inquiry handler and the response handler;
sending the first and second inquiry vectors across a computer network to the inquiry handler;
broadcasting the first and second homomorphically encrypted inquiry to the responder, wherein the broadcasting step is performed by the inquiry handler;
identifying the response handler to the responder such that each responder can send a response to the response handler, the step of identifying the response handler being performed by the inquiry handler;
receiving, by the response handler, first and second responses from the responder which correspond to the first and second homomorphically encrypted inquiries, wherein the responder raised each element of the first and second homomorphically encrypted inquiry vector by a power equal to the rating score;
producing, by the response handler, a first summary response corresponding to the first responses and a second summary response corresponding to the second responses;
sending the first and second summary responses to the inquirer; and
algebraically combining the first and second summary responses, by the inquirer, according to the predetermined algebraic operation to enable the inquirer to determine the rating score for the inquiry target as determined by the responder.

3. The method as recited in claim 2, wherein the step of applying homomorphic encryption is performed by the inquirer.

4. The method as recited in claim 2, wherein the inquirer chooses the first encryption key.

5. The method as recited in claim 2, further comprising a step of finalizing the first summary response by adding a random noise from a random number generator with a seed value and the seed value is sent to the inquirer along with the first summary response.

6. The method as recited in claim 2, further comprising a step of specifying an agent to act on behalf of the inquirer.

7. The method as recited in claim 6, wherein the step of applying homomorphic encryption is performed by the agent.

8. The method as recited in claim 7, wherein the step of sending the first and second inquiry vectors sends the first and second inquiry vectors from the agent to the inquiry handler.

* * * * *